(12) United States Patent
Büchler (10) Patent No.: US 7,280,450 B2
(45) Date of Patent: Oct. 9, 2007

(54) METHOD AND DEVICE FOR DETECTING LAND PRE-PITS

(75) Inventor: Christian Büchler, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 527 days.

(21) Appl. No.: 10/838,660

(22) Filed: May 4, 2004

(65) Prior Publication Data
US 2005/0002305 A1    Jan. 6, 2005

(30) Foreign Application Priority Data
May 14, 2003 (FR) .................. 03 010790

(51) Int. Cl.
*G11B 7/00* (2006.01)
(52) U.S. Cl. .................. 369/47.27
(58) Field of Classification Search .......... 369/44.26, 369/44.13, 53.22, 47.1, 47.27
See application file for complete search history.

(56) References Cited

U.S. PATENT DOCUMENTS

| 0,028,613 A1 | 10/2001 | Okamoto et al. ............. 369/65 |
| 6,999,391 B2 * | 2/2006 | Heemskerk et al. ..... 369/53.34 |
| 7,084,802 B1 * | 8/2006 | Suetake ...................... 341/157 |

FOREIGN PATENT DOCUMENTS

EP    1039453 A1    3/2000
EP    1184850 A2    8/2001

OTHER PUBLICATIONS

Abstract of Japan Publication 2000207744 Publication Date 28-078-00 App. Date Dec. 28, 1998 App. No. 10373363 Applicant-Ricoh Co Ltd. Inventor-Kubo Hiroshi Int. Cl. G11B 7/005 Title Pit Signal Detecting Circuit Copyright 2000, JPO.
Abstract of Japan Publication 2002109742 Publication Date Apr. 12, 2002 App. Date Sep. 28, 2000, App. No. 2000296266 Applicant-Matsushita Electric Ind. Co. Ltd. Inventor—Matsuura Takumi Int. Cl. G11B 7/0045 G11B 7/004 G11B 7/005 Title Land Prepit Detection Device And Optical Disk Apparatus Using The Same Copyright 2002, JPO.
Article ECMA Standardizing Inf. And Comm. Systems Title 80 mm (1,23 Gbytes per side) and 120 mm (3,95 Gbytes per side) DVD-Recordable Disk (DVD-R) Stand ECMA—279 Dec. 1998—4 pages double sided.

* cited by examiner

*Primary Examiner*—Nabil Hindl
(74) *Attorney, Agent, or Firm*—Joseph J. Laks; Harvey D. Fried; Patricia Verlangieri (57) ABSTRACT

The address information of DVD-R or DVD-RW discs should be identified more accurately. Therefore, the detector is implemented with a sample/hold device for storing a reference value to be used for a sampling window. An optional integrator is used for comparing the integrated signal with a reference value to decide on the presence of a land pre-pit. The timing for controlling both the sample/hold device and the integrator is derived from a phase locked loop that is locked to the incoming groove wobble signal (TWin) by performing a clock multiplication with a predetermined factor. Advantageously, no band pass filter has to be included, which would need to be tuned according to the variations of the disc speed. Furthermore, the proposed land pre-pit detector is less affected by variations of the input amplitude, as no limiter is used.

10 Claims, 12 Drawing Sheets

METHOD AND DEVICE FOR DETECTING LAND PRE-PITS

FIELD OF THE INVENTION

The present invention relates to a method for detecting marks on an optical recording medium including the step of scanning a track on the optical recording medium by obtaining a scanning signal including information about the marks to be detected. Furthermore, the present invention relates to a corresponding device for detecting marks on the optical recording medium

BACKGROUND OF THE INVENTION

In the known ECMA-279 standard for DVD-R ("ECMA—Standardizing Information and Communication Systems: 80 mm (1.23 Gbytes per side) and 120 mm (3.95 Gbytes per side) DVD-Recordable Disk (DVD-R)") and the ECMA 338 standard for DVD-RW ("ECMA—Standardizing Information and Communication Systems: 80 mm (1.46 Gbytes per side) and 120 mm (4.70 Gbytes per side) DVD Re-recordable Disk (DVD-RW)") the address information to identify a position on an unrecorded disc is stored in the so-called land pre-pits (LPP). These pre-pits are situated in the lands, which are the areas that separate the recording grooves, i.e. the tracks, from each other. Both the grooves as the recordable area and the lands holding the land pre-pits are formed during the mastering process of the disc, i.e. they are available on an unrecorded/blank disc.

Figure 1:
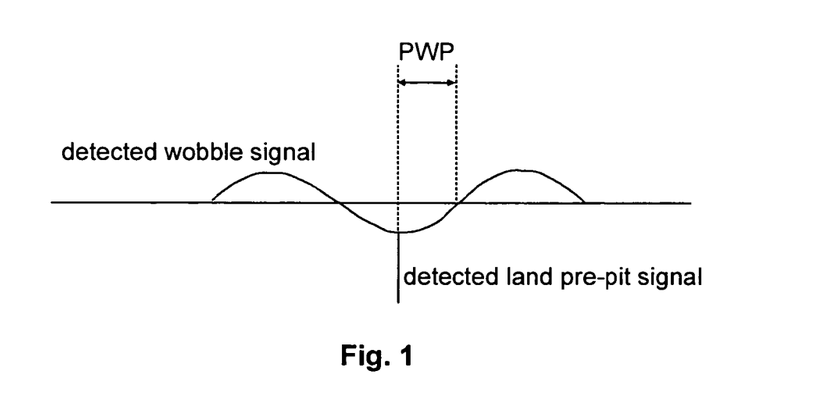
FIG. 1 the phase relation between the wobble and the land pre-pit as described in ECMA-279 and ECMA-338.

The grooves are circles or spirals with a small radial sine wave shaped deviation called track wobble as shown in FIG. 1. A respective track wobble signal can be detected using a track error signal such as the push-pull signal. Additionally, some filtering or AC-coupling is applied. As well, the land pre-pits are detected by using the push-pull signal, as this signal also shows the reflectivity change on the outer edges of the groove, i.e. the neighbouring lands.

The land pre-pits, which belong to the groove that is actually read or recorded, are always situated on one side of the groove. According to ECMA-279, they are embossed on a predetermined position versus the track wobble modulation of the track. The groove wobble is regarded as a sine wave and the phase relation between the groove wobble and the land pre-pit signals (PWP) is defined to be $-90°\pm10°$. Thus, the PWP value is measured as the phase between the largest point of the LPP-signal and the average zero crossing point of the wobble. The LPP search can accordingly be triggered by detecting the PWP value.

Furthermore the track wobble signal can be used for controlling the rotational speed of the optical recording medium during recording or playback. To create a reliable recording medium speed signal, a phase locked loop (PLL), which is locked to the track wobble, is typically used. The clock output of this PLL can be used to close a recording medium rotational speed loop. If this PLL is locked to the track wobble, also timing signals to control the land pre-pit detection block can be derived.

A simple detection system (FIG. 2) is proposed in ECMA-279 (Annex Q). As already mentioned the land pre-pit signal as well as the track wobble frequency is derived from the Push-Pull signal 1. The signal algebra to generate the Push-Pull signal is (A+B)−(C+D), wherein A, B, C and D are the four signals of a four-quadrant detector (not shown here) for detecting the position of the reflected laser beam. The push-pull signal is fed to a limiter 2, which cuts spikes which are above the typical push-pull amplitude, and is then processed by a band pass filter 3, which cuts off frequency components higher or lower than the nominal track wobble frequency. Then a voltage V1 is added. The result of this signal processing is compared with the original signal by a first comparator 4. A PLL (not shown) locks on the track wobble frequency. The PLL creates a locked sine wave signal having the same frequency and phase as the track wobble frequency. The PLL's output signal is compared with a second reference voltage V2 by a second comparator for creating a detection window. The outputs of the two comparators 4, 5 are combined via a noise gate 6, which typically performs a logical AND-operation.

Figure 3:
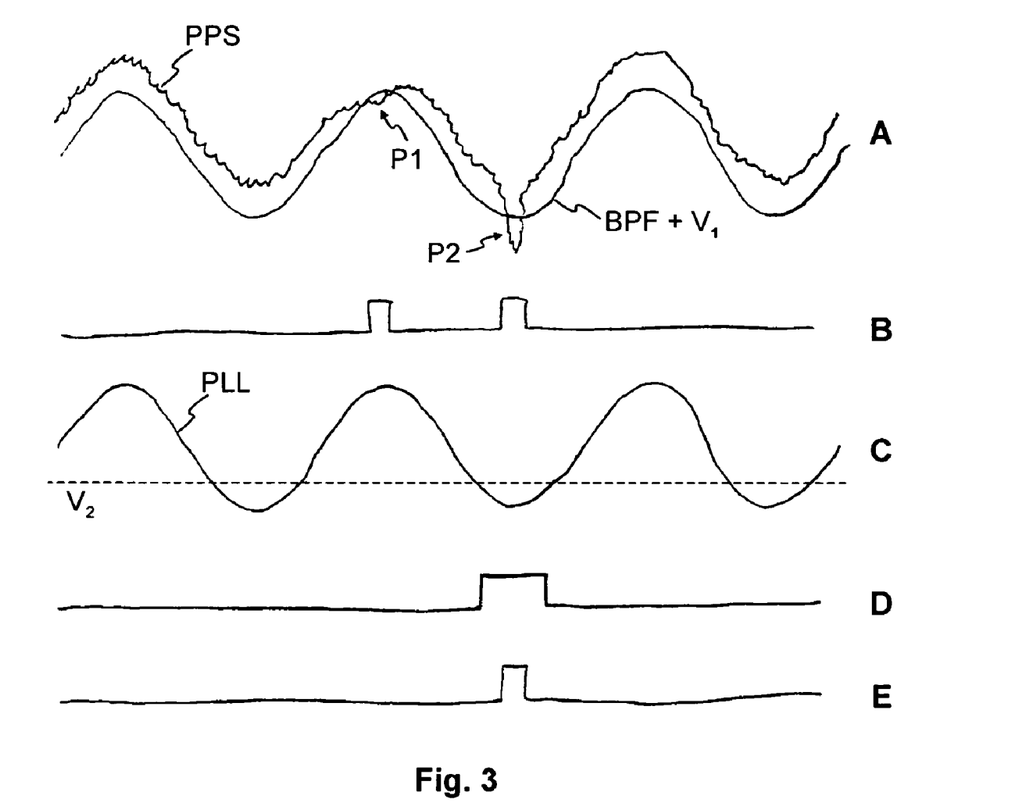
FIG. 3 signal waveforms of the standard detector.

A corresponding signal diagram is shown in FIG. 3. The curves A in FIG. 3 are the signals applied to the first comparator 4. The push-pull signal PPS has the typical sine wave form superimposed by some noise. At point P1 the PPS signal shows a distortion. At point P2 the PPS signal is deformed due to a land pre-pit. The second curve BPF+V1 in FIG. 3A represents the PPS signal filtered by the band pass filter 3 and shifted downwards by a constant voltage V1. The comparator 4 detects that the signal PPS is below the signal BPF+V1 at the points P1 and P2. The resulting comparator signal is given in FIG. 3B. In parallel the second comparator 5 compares a PLL signal having the same frequency as the PPS Signal with a constant voltage signal V2 as shown in FIG. 3C. As a result a second comparator 5 outputs a gate signal as depicted in FIG. 3D. An AND-operation of the signals of FIG. 3B and 3D leads to the signal shown in FIG. 3E. Thus, the comparator signal produced by the distortion at point P1 is eliminated by this AND-operation and a usable land pre-pit signal is obtained.

In the ECMA-279 system, the signal created by the land pre-pit pulse does not have a constant amplitude. Furthermore, it can be influenced by HF components due to imperfect common mode cancellation through the subtraction (A+B)−(C+D).

Also, influences on both track wobble amplitude and land pre-pit amplitude will occur caused by the neighbouring tracks. In case of the track wobble amplitude the effect is called wobble beat.

Figure 2:
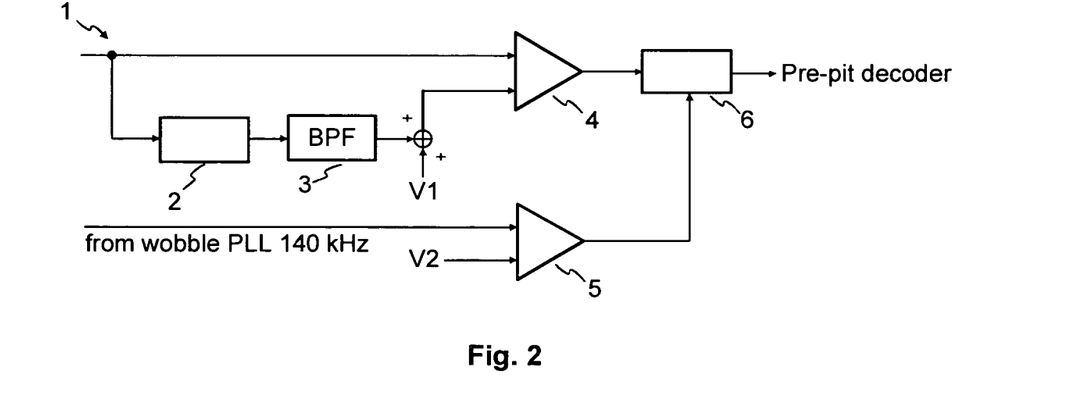
FIG. 2 a land pre-pit detector as described in the standard.

The land pre-pit detector proposed in ECMA-279 is based on the comparison of the limited and band passed signal compared with the original signal. If the amplitude of the track wobble signal rises above or falls significantly below the limiter values, the first comparator 4 might fail to detect the existing land pre-pits. Also, if the playback or recording speed is changed, as for example in a CAV mode, the BPF 3 needs to be tuned accordingly. A further drawback of the standard detector circuit is that the PLL (not shown) must create a synthesized sine wave of constant amplitude to enable the creation of a reliable noise gate signal.

In this connection the document EP 1 184 850 A2 discloses a recording and reproducing apparatus capable of detecting a land pre-pit on an optical disc securely with a high precision. One of the signals output from a split detector is multiplied with a predetermined coefficient, which is changed depending on an error rate upon decoding of land pre-pits, a lens shift amount of an objective lens, and the levels of the land pre-pits signal and a wobble signal relative to a data signal.

SUMMARY OF THE INVENTION

It is an object of the present invention to provide an alternative method and device for securely detecting a land pre-pit signal.

According to the present invention this object is solved by a device for detecting marks on an optical recording medium including scanning means for scanning a track on said optical recording medium by obtaining a scanning signal including information about said marks to be detected, storing means for storing said scanning signal at a predetermined sampling time as reference signal and determining means for determining a mark, if said scanning signal deviates from said reference signal in a predetermined way.

Furthermore, according to the present invention there is provided a method for detecting marks on an optical recording medium including the steps of scanning a track on said optical recording medium by obtaining a scanning signal including information about said marks to be detected, storing said scanning signal at a predetermined sampling time as a reference signal, and determining a mark if said scanning signal deviates from said reference signal in a predetermined way.

Compared to known solutions the present invention has the advantage that no band pass filter has to be used, which needs to be tuned according to variations of the rotation speed (CAV mode etc.). Furthermore, the land pre-pit signal obtained according to the present invention shows less dependency on the variations of the input amplitude as no limiter is used. Also the creation of the gate timing shows less dependency on the signal level, as the timing is derived from a clocking instead. Additionally, the land pre-pit signal shows less dependency on the detection window accuracy (phase) as compared to the single shot detection.

Advantageously, the storing means includes a sample/hold (S/H) device or a digital memory device for storing an actual track wobble signal value.

The optical recording medium may be a DVD-R or DVD-RW and the mark to be detected may be a land pre-pit.

Favourably, the determining means includes subtracting means for subtracting the reference signal from the scanning signal, integrating means for integrating the subtraction signal, and comparator means for comparing the integrated signal with a threshold. In this case the integrated signal depends on the absolute difference of the reference signal and the sampling signal. Optionally, the inventive device may include a normalizing means for normalizing the subtraction signal.

Alternatively, the determining means includes a first comparing means for comparing the reference signal with the scanning signal, integrating means for integrating the first comparing signal and a second comparing means for comparing the integrated signal with a threshold. In this case, the integrated signal only depends on the relative difference between the reference signal and the sampling signal.

Preferably, the scanning signal is a track wobble signal. Furthermore, the predetermined sampling time is determined in dependence of the phase of the sampling signal.

Favourably, the method according to the invention is performed in an apparatus for reading from and/or writing to optical recording media. This allows a reliable detection of the land pre-pits on the optical recording medium.

BRIEF DESCRIPTION OF THE DRAWINGS

The present invention will now be described in more detail in connection with the attached drawings, showing in.

DETAILED DESCRIPTION OF PREFERED EMBODIMENTS

To generate the timing signals that are used for controlling the timing of the LPP detector, preferably, a PLL performing a clock multiplication by a predetermined factor is used. For example, if a clock multiplication of 8 is used, a resolution of 45° within a 360° track wobble period is achieved. Accordingly, using a higher multiplication factor increases the resolution of the timing, which can be derived from the PLL clock. As the land pre-pits are situated at a predetermined nominal center position (270°±10° in DVD-R/RW) and have a predetermined nominal width (8-10T, i.e. ±7.5° in DVD-R/RW), a detection window is created on the basis of the multiplied track wobble PLL clock using a counter and a logic which determines gating signals according to the counter values. These gating signals control a sample/hold and optionally an integrator. Also a trigger can be created which drives a D-FF (D-flip-flop), which samples the logic level of a comparator output for determining if a land pre-pit was detected within the gate.

Figure 4:
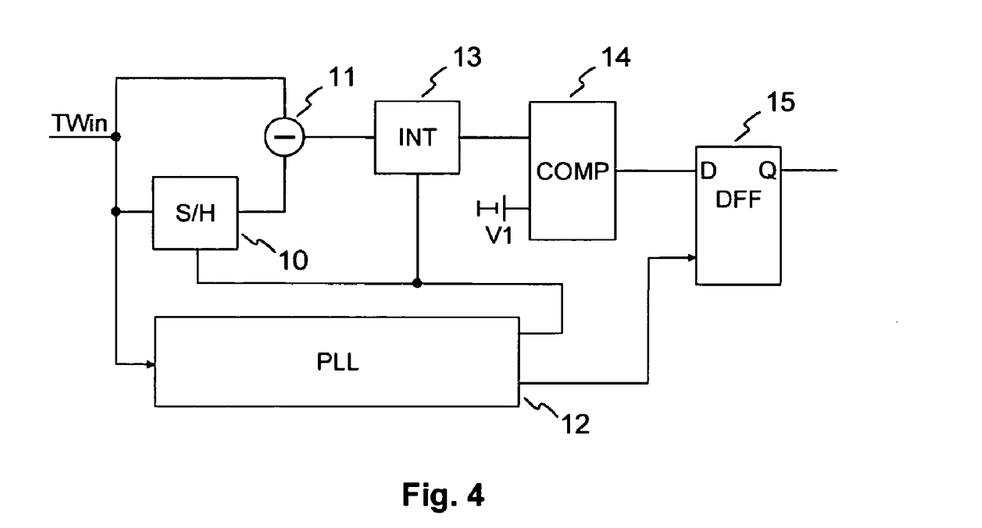
FIG. 4 a block diagram of an analog detector according to the present invention.

An example of an analog implementation according to the invention is shown in the block diagram of FIG. 4. The track wobble input signal TWin is fed to a subtractor 11 directly and via a sample/hold element 10. The timing signal for the S/H element 10 is obtained by a PLL circuit 12 to which the TWin signal is input. The timing signal creates a sampling window by enabling a hold slightly before the expected start position of a LPP. The hold function remains enabled for the nominal length of a LPP.

The output of the subtractor 11 is supplied to an integrator 13, which is also controlled by a counter counting the clock cycles of the PLL circuit 12. The output of the integrator 13 is compared with a constant voltage V1 in a comparator 14. The output signal of the comparator 14 is provided to a D-FF 15, which is also controlled by the clock of the PLL circuit 12. The D-FF 15 will store the result of the comparison performed by the comparator 14 at the end of a sampling window, for further signal processing.

Figure 5:
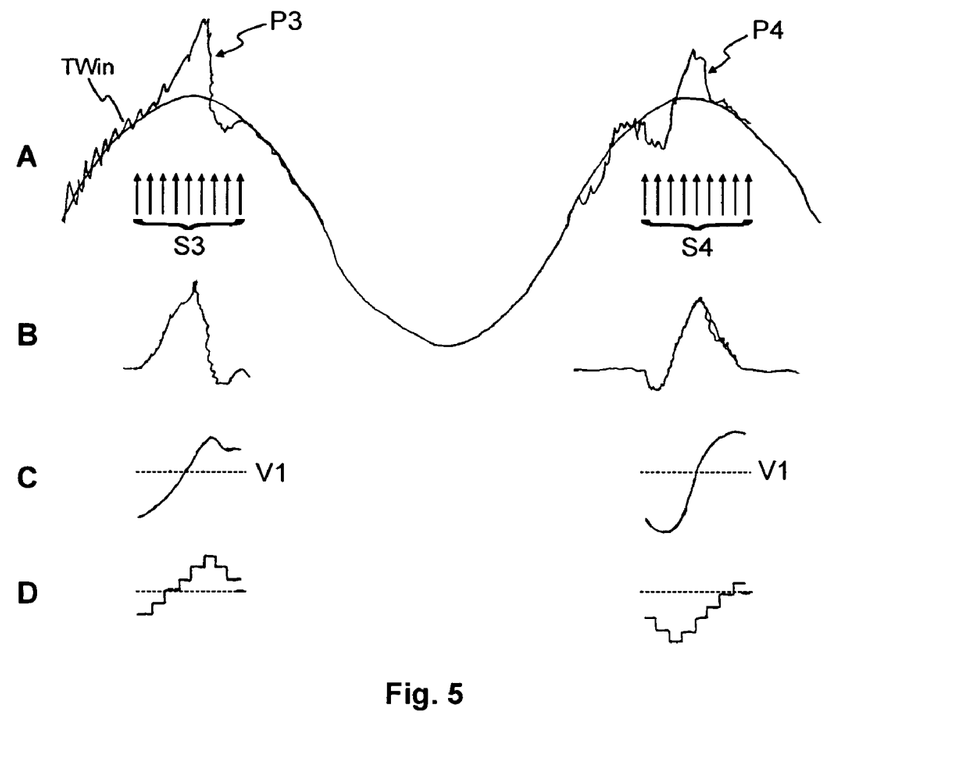
FIG. 5 signal waveforms of the inventive detector.

FIG. 5 shows the corresponding signal diagrams. In part A of FIG. 5 there is presented the TWin signal at the input of the detection circuit. The TWin signal has approximately the shape of a sine wave. At the positive maximum of the TWin signal the sine wave shape is distorted by a detected land pre-pit at the positions P3 and P4, respectively. Sampling windows S3, S4 are started slightly before the expected LPP position and are stopped just after the expected end of the LPP. As the LPP has a nominal phase shift versus the zero crossing of the wobble signal TWin, the timing can be derived from a counter being a part of a PLL locked to the Twin signal. Consequently the sampling windows are generated close to the expected LPP trigger point as indicated in FIG. 1.

The value of the TWin signal at the start of a sampling window is taken as a reference value. This reference value is subtracted from the actual TWin signal so that the signal of FIG. 5B is obtained. This signal is integrated and compared with a threshold value as indicated in FIG. 5C. In both cases on the left side and the right side of FIG. 5C the integrated signal raises beyond the threshold value, which indicates that a land pre-pit has been detected.

In case of digital signal processing indicated by the sampling points of FIG. 5A in the sampling windows S3 and S4 an actual sampled value is compared with a preceding sampled value. If the actual value is higher than the preceding value, a counter is incremented. Otherwise, the counter is decremented as indicated in FIG. 5D (compare circuit of FIG. 7).

Figure 6:
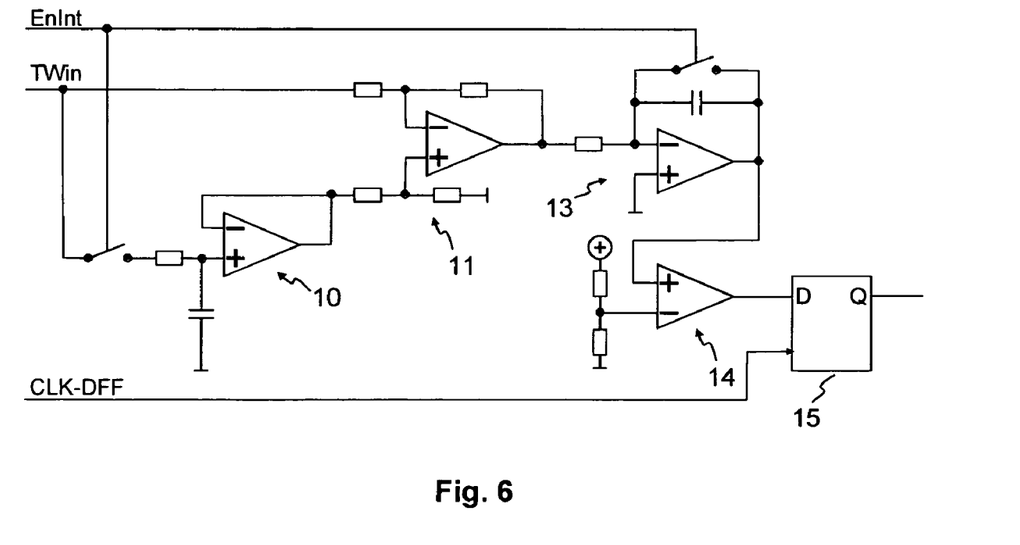
FIG. 6 a circuit diagram of the detector shown in FIG. 4.

FIG. 6 shows a detailed circuit diagram as an exemplary embodiment of the LPP detector presented in FIG. 4.

The start of the detection gate (EnInt; enable integration) switches the S/H 10 from sample to hold mode, which holds the non inverting input of the operation amplifier of the S/H 10 at the level just before the position in which the land pre-pit pulse is expected (start of the sampling window S3, S4 in FIG. 5). At the same time, the integrator 13 is started, which significantly changes its output voltage if a land pre-pit exists. The TWin signal is subtracted from the voltage that is held through the S/H 10 by the subtractor 11, and the result is a voltage that is the integral of the LPP pulse. At the end of the LPP pulse this integrated signal usually has its largest amplitude. The output of the difference amplifier of the integrator 13 is supplied to a voltage comparator 14 which compares the integrated voltage with a predetermined threshold voltage V1, which is favourably created by a voltage divider. The threshold voltage V1 is selected such that an integrated pulse voltage will always be larger, but the integration of a non-existing pulse will be smaller than the threshold voltage. Consequently the threshold voltage V1 will always be a positive voltage. For example, V1 could be factory-adjusted at a fixed value being a fraction of the nominal integrated voltage when a land pre-pit was present, assuming that the LPP content of the TWin signal also has a nominal amplitude as indicated in the standard.

The standard describes the normalized land pre-pit amplitude as the peak amplitude of the land pre-pit divided by the average mirror voltage A+B+C+D [0.14<LPP<0.28]. If the land pre-pit is integrated during a constant period matched to the length of the land pre-pit, the resulting voltage will still be a fraction of the mirror voltage, i.e. the integrated voltage divided by the mirror voltage has a predictable value dependent on the integration time constant. As the land pre-pit superimposed on the TWin signal scales with the reflection of the recording medium and the laser power, the threshold voltage V1 is favourably varied accordingly. The easiest way of scaling V1 is to connect the supply voltage of the voltage divider to a mirror signal generating block (not shown) instead of connecting it to a fixed voltage as shown in FIG. 6. Shortly before the end of the gate S3, S4, the comparator's output is sampled by the D-FF 15, then the integrator 13 is reset and the S/H 10 switches back to sample mode for detecting the next land pre-pit pulse which might appear after a multiple of 360°.

Figure 7:
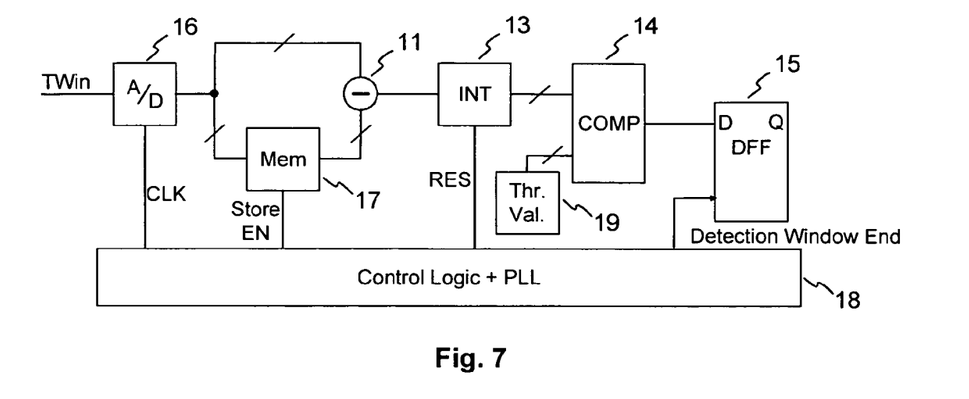
FIG. 7 a block diagram of a digital detector.

The method described above can be transferred into the digital domain (FIG. 7). The track wobble signal is A/D converted first by an A/D converter 16. The A/D converted value is stored into a memory 17 at the start of the detection window, which is created by the PLL and control logic 18. A digital difference is then built in the subtractor 11 to calculate the difference between the actually sampled value and the one which was stored. A digital accumulator or integrator 13 adds up the sampled differences to build the integral of the sampled difference values. At the end of the detection window, the integrated value is compared by a comparator 14 with a predetermined threshold value 19 to detect the existence of a land pre-pit. Assuming that the sampling is controlled by the track wobble PLL 18, which multiplies the TW clock by a predetermined factor, then the number of samples and the number of integrations is independent of the track wobble frequency and thus of the recording or playback speed of the drive. In this case the digital integrator 13 has an advantage over the analog solution, because the digital integrator 13 automatically scales with the TW frequency, whereas the integration time constant $\tau = R \cdot C$ of the analog integrator needs to be scaled. If n is the speed factor based on a predetermined nominal speed/track wobble frequency, the resistor or the capacitor needs to be scaled inversely ($1/n \cdot C$ or $1/n \cdot R$). Then the integration result of a land pre-pit pulse is independent of the recording speed.

Following a slightly different approach (FIG. 8 analog, FIG. 9 digital implementation), the difference between the actual and the stored TW value is derived by a first comparator 20, and the result of the comparison (direction signal DIR) is fed to the input of the integrator 13. Consequently the integrator's voltage rises or falls according to the result of the difference, whereas the slope of the integration is no longer dependent on the value of the difference. This makes the integration independent of amplitude variations of the land pre-pit pulse. As above, the integration using the analog approach is still dependent on the recording speed or the TW frequency. As to the other circuit elements it is referred to FIG. 4.

Figure 9:
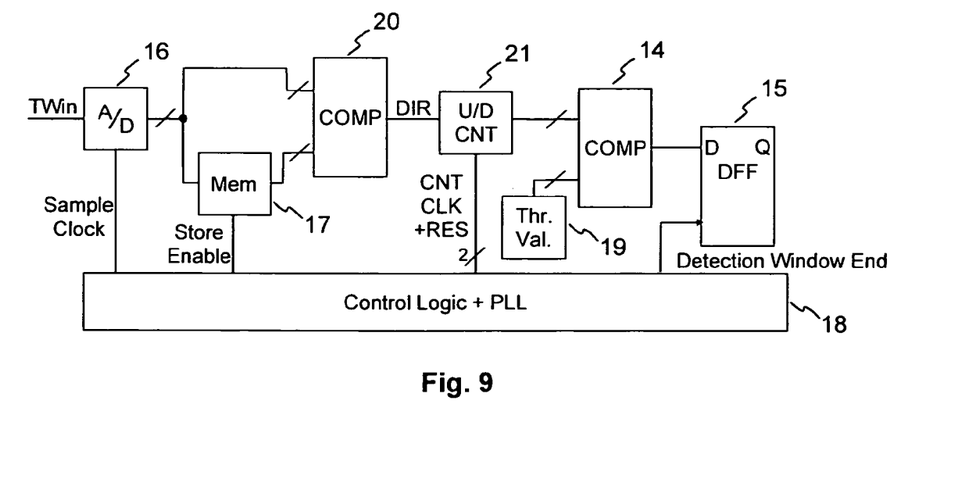
FIG. 9 a block diagram of an alternative digital detector.

As already indicated, the second approach described above can also be implemented in the digital domain (FIG. 9). The TW signal is quantized by an A/D converter 16 and the sampled value is stored in a memory 17 at the start of the detection window. The actually sampled values and the stored value are compared during the detection window synchronously with the sampling clock. The result of the comparison decides the direction of a digital up/down counter 21, which is typically started with the value zero at the beginning of the detection window. The counter 21 is counting up or down at each clock pulse which is created by the control logic 18 within the detection window. The counter value is finally compared with a predetermined threshold value at the end of the detection window. This is preferably done by a D-FF 15. After that the memory 14 and the counter 21 are reset to be ready for the next detection process starting with another detection window. The control logic 18 can be implemented by using monoflops for the timing, but is preferably implemented by counters and comparators, which are controlled by a clock derived from a PLL clock multiplier that is locked to the TW-clock, as already mentioned. Supplementary it is referred to the elements of FIG. 7.

The detection system as described above has several basic advantages. The result of the counted value at the end of the detection window is not dependent on the amplitude of the TW-signal. Only the comparison result of actual value and stored value decides on the direction of counting. As the counter gets a predetermined number of clock pulses from the control logic resp. the PLL, the counter value at the end of the detection pulse is not dependent on the recording or playback speed of the optical recording medium. As the integration is performed during the whole detection window, the detection process is less sensitive to distortions of the land pre-pit pulse as compared to a single shot detection as proposed in the standard. As the integration is performed during the whole detection window, the detection process is less sensitive to phase errors of both the PLL phase and the exact position of the land pre-pit pulse as compared to a single shot detection as proposed in the standard.

Figure 10:
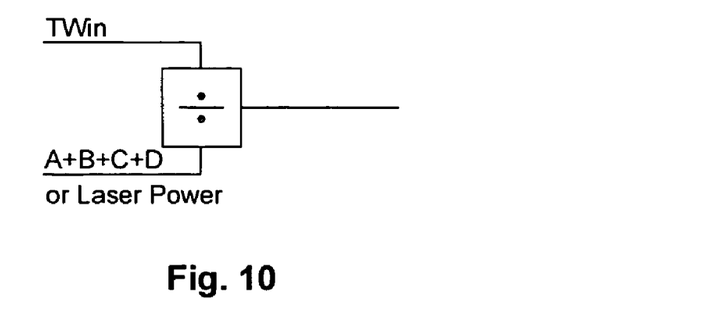
FIG. 10 a block diagram of a first normalizing circuit.
Figure 11:
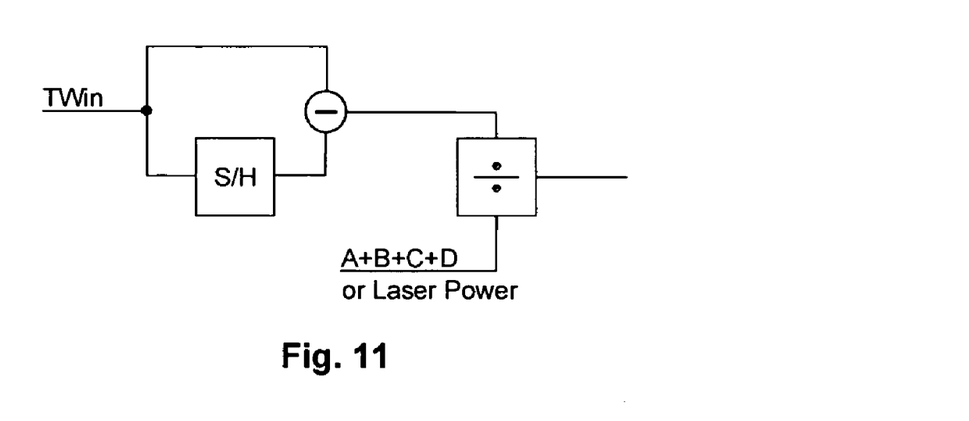
FIG. 11 a block diagram of a second normalizing circuit.

To get an improved LPP detection for variations of the reflection of the optical recording medium during read (both caused by mark-space reflection change or by fingerprint influence) or during writing, it is advantageous to add a normalization. This normalization is for example applied to the TWin signal itself or to the signal which is obtained from the difference of the TWin signal and the sampled (S/H) TWin signal, as in FIGS. 4, 6 and 7. It may be unnecessary to apply the normalization if the TWin signal and the sampled (S/H) TWin signals are compared by a comparator, as the result of this comparison is binarized. Consequently the result of the comparison is not dependent on the level of each of the signals, and normalisation can be omitted (as in FIGS. 8, 9). The normalization's numerator favourably is the signal TWin as indicated in FIG. 10 or the difference of TWin and the sampled (S/H) TWin as indicated in FIG. 11. The denominator advantageously is the DC-coupled RF signal (A+B+C+D) or a signal representing the laser power level during the write process.

Figure 12:
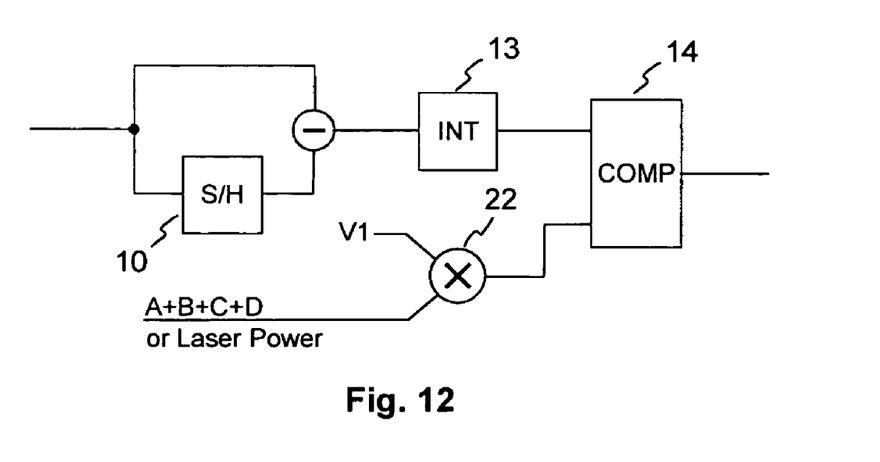
FIG. 12 a block diagram of a normalizing circuit added to the circuit of FIG. 4.
Figure 13:
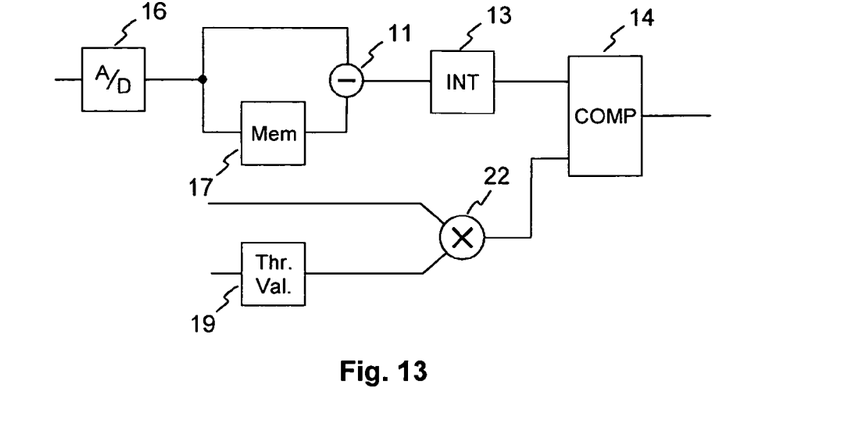
FIG. 13 a block diagram of a normalization circuit added to the circuit of FIG. 7.
Figure 14:
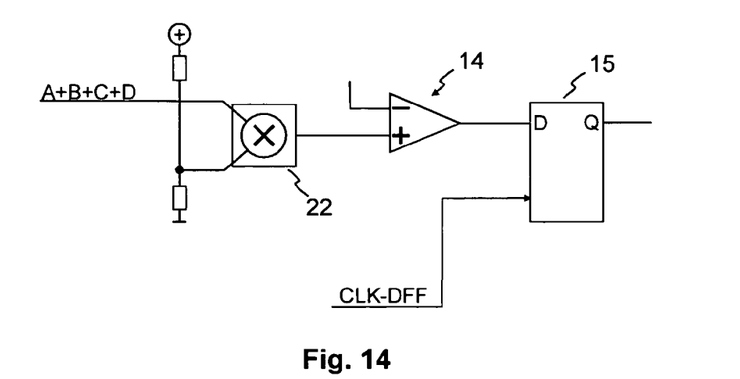
FIG. 14 a normalization circuit added to the circuit of FIG. 6.

Alternatively, the LPP threshold level V1 at the LPP detecting comparator 14 after the subtractor 11 or after the integrator 13, FIGS. 4, 6 and 7, can be scaled (multiplied) by a signal representing the amount of reflected light from the optical recording medium. This is favourably done with the DC-coupled RF signal (A+B+C+D) or with a signal representing the laser power during the write process by a multiplier 22 as indicated in FIG. 12 corresponding to FIG. 4 and in FIG. 13 corresponding to FIG. 7. FIG. 14 indicates the analog circuit of FIG. 6 supplemented with the scaling multiplier 22.

Figure 8:
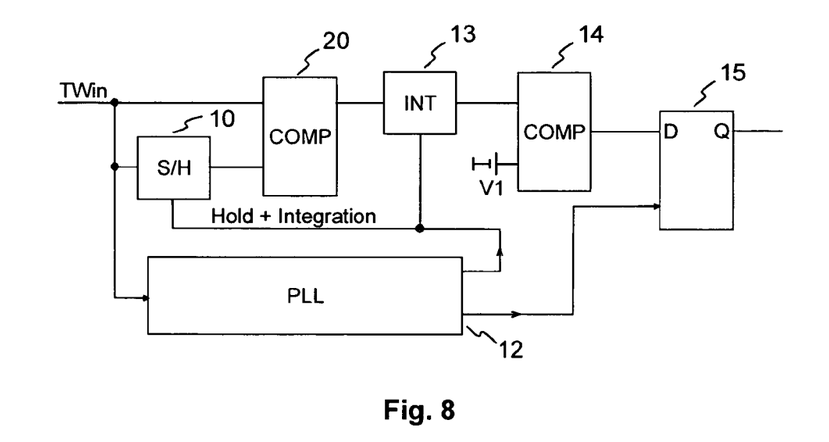
FIG. 8 a block diagram of an alternative analog detector.

The PLL block of FIGS. 4 and 8 will now be represented in more detail below. For this purpose, the function of a PLL shall shortly be explained in a first version according to the state of the art. A more detailed description regarding the mode of operation of PLLs can be found in the technical book "Halbleiter-Schaltungstechnik", published by Springer Verlag Berlin, as well as in further relevant technical literature.

Figure 15:
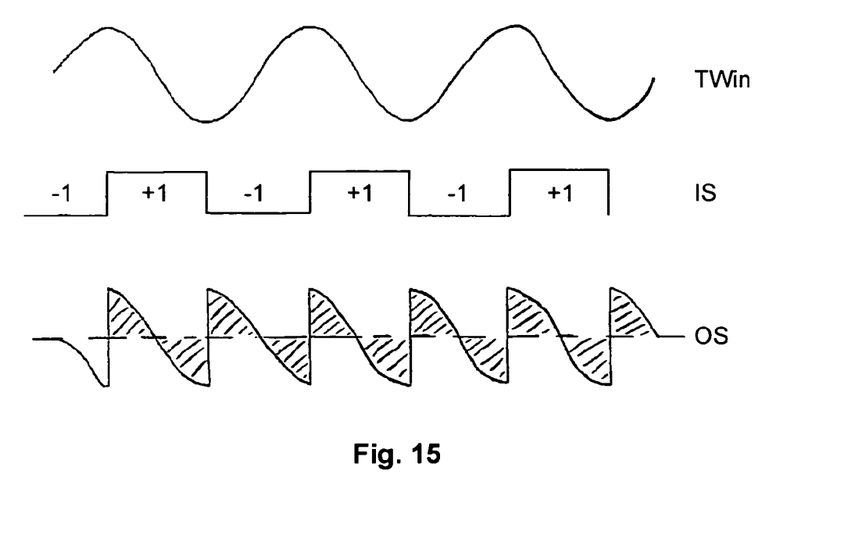
FIG. 15 a typical signal diagram of a PLL according to the state of the art representing the locked state without phase shift.

FIG. 15 shows a respective signal diagram showing the locked case without a phase shift from the nominal phase. A sinusoidal first input signal (TWin) and a rectangular shaped second input signal (IS) are applied to a phase comparator. The rectangular shaped signal (IS) indicates if the first input signal (TWin) is to be multiplied by +1 or −1 by the phase comparator to generate the phase error as shown in the last waveform of FIG. 15.

In this case, the phase comparator is for example a multiplier forming the product of both input signals (TWin, IS), which is also shown. In the ideal case the nominal phase of both input signals is such that the average value of the product (OS) is zero. This is indicated by the same size of the areas above and below the dotted base line. The product is referred to as phase error.

Figure 18:
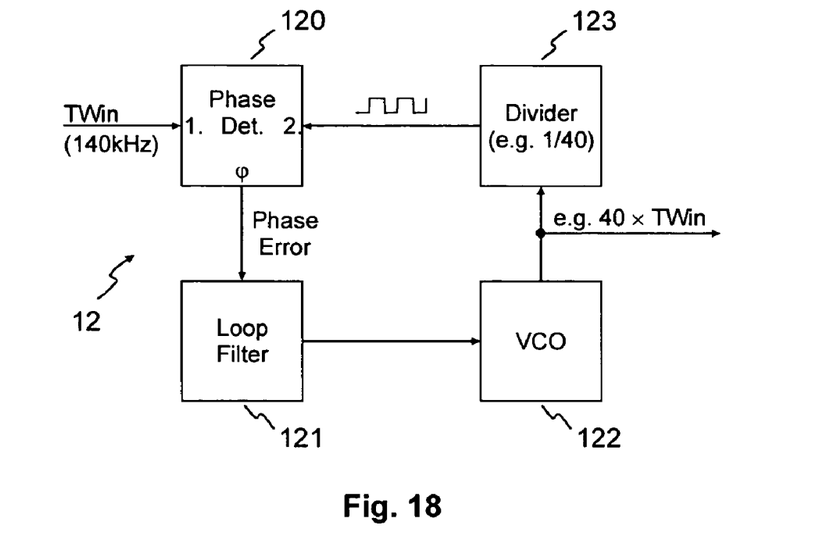
FIG. 18 a PLL according to the state of the art, which forms the signals according to FIGS. 15 and 17.

In FIG. 18 a PLL according to a first example of the state of the art is depicted. By means of a loop filter 121 the average value of the phase error of FIG. 15 is calculated, which is detected by a phase detector and a phase comparator 120, respectively. In the easiest case the loop filter 121 consists of a RC low-pass filter. The signal obtained in this way controls the frequency and phase of a voltage controlled oscillator (VCO) 122, the output of which is transferred to a frequency divider 123. The output signal of the frequency divider 123 divided by n is supplied to the second input of the phase comparator 120, by which the PLL control loop is closed. The frequency divider 123 is for example designed as a divider by forty.

Figure 17:
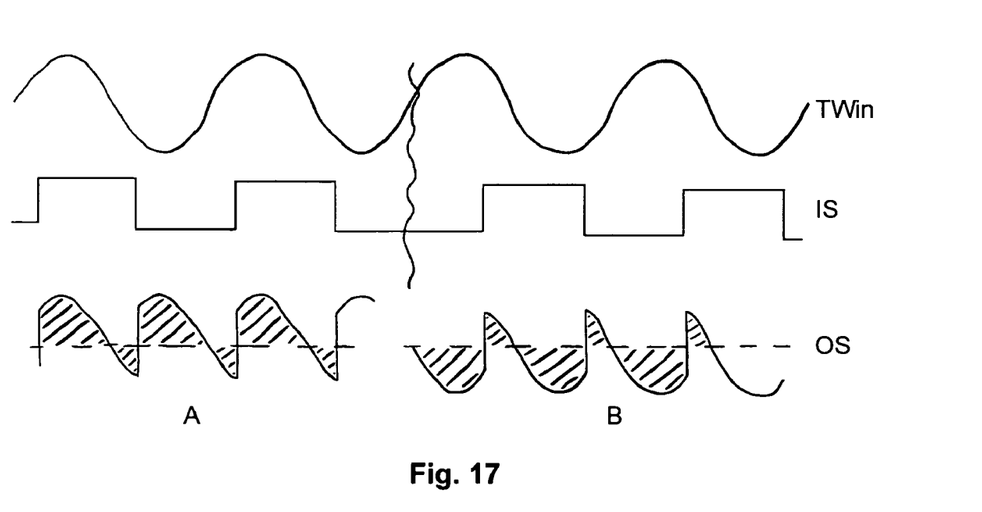
FIG. 17 a signal diagram according to FIG. 15, but a with negative or positive phase shift, respectively.

The basis of the signal diagram in FIG. 15 is that the phase deviation from the nominal phase is zero. Thus, the voltage supply of the VCO 122 in FIG. 15 is already set so that the frequency of the VCO 122 corresponds to forty times the frequency of the input signal TWin. At exactly this moment an output signal of the frequency divider 123 is generated, the frequency of which is the same as for the input signal. A remaining phase difference will then become apparent in the phase error signal as depicted in FIGS. 17A and 17B. The input signal TWin at the first input of the phase detector shows a phase shift of −45° versus the nominal phase of the output signal of the frequency divider at the second input of the phase detector in FIG. 17A, by which the output signal of the phase detector changes so that the average value becomes positive. FIG. 17B shows how a phase shift of +45° versus the nominal phase of the two signals has an effect to the output of the phase detector 120. The average value of the resulting phase error signal becomes negative. If the average value of the phase error differs from zero, the setting of the VCO is influenced so that the phase shift of the signal resulting from frequency division is corrected to reach the phase position as shown in FIG. 15.

Figure 16:
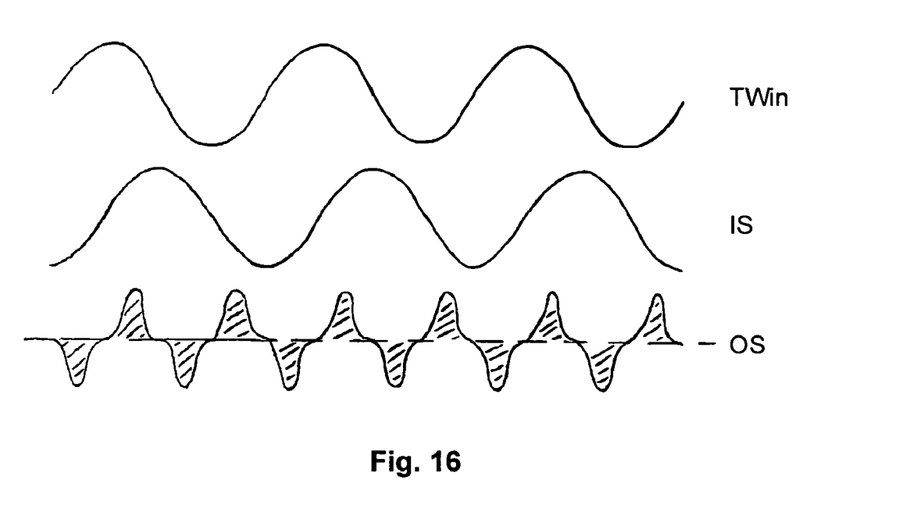
FIG. 16 another typical signal diagram of a PLL according to the state of the art representing the locked state without phase shift.
Figure 19:
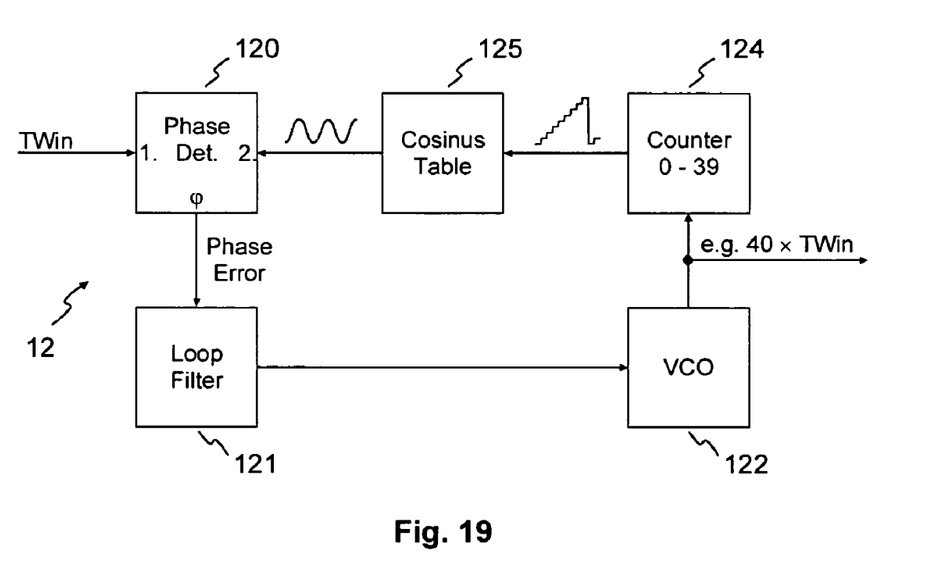
FIG. 19 a PLL according to the state of the art, which forms the signals according to FIG. 16.

An example of a digital PLL according to the state of the art is shown in FIG. 19. Instead of a frequency divider, a counter 124 as well as a cosine-table 125 are provided. The cosine-table 125 is, for example, constructed so that a complete cosine wave is generated after e.g. forty counter steps. Since frequency and phase of the PLL 12 must be the same when in the locked state, exactly forty steps must therefore be passed through within a period of the input signal. Thus, the VCO again generates forty times the frequency of the input frequency to generate a cosine wave having the same period as the one of the input frequency. The phase error signal, which is created by multiplying the input signal TWin by the cosine signal, is shown in FIG. 16, wherein the phase shift from the nominal phase is also zero as in FIG. 15. As well, in this case the average value of the phase error is zero since the positive and negative areas are of the same size.

Figure 20:
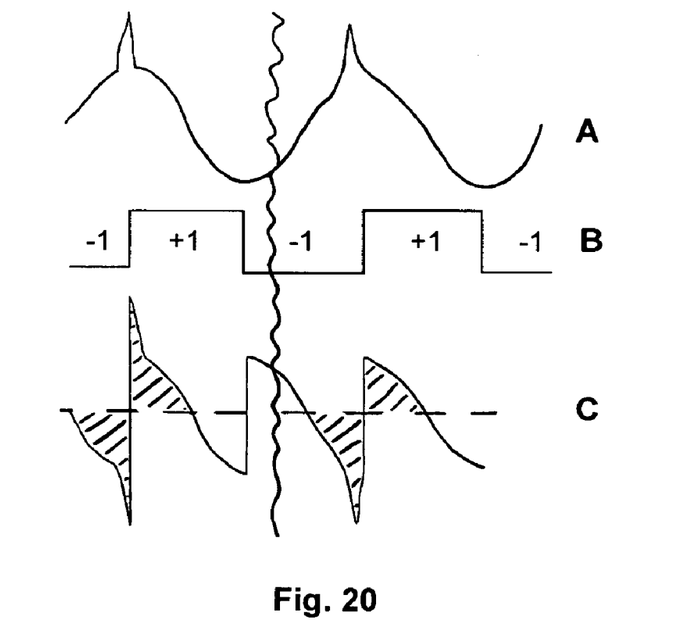
FIG. 20 a signal diagram when using a PLL according to the state of the art in the range of the LPP.

FIG. 20 shows, by way of a signal diagram, how the occurrence of a land pre-pit (LPP) influences the generation of the phase error despite of an actually correct phase of the track wobble signal (TWin) with respect to the square-wave signal at the second input of the phase detector 120. On the left hand side a LPP signal is depicted, which does not show any shift caused by tolerance with respect to the TW signal. Because of the occurrence of the LPP, the phase error is symmetrically changed, wherein the phase error (FIG. 20C) resulting from the multiplication by the signal of FIG. 20B remains zero due to same areas. In the right part of the drawing of FIG. 20 the position of the LPP deviates from the middle of the track wobble signals (TWin) due to a shift caused by tolerance. The average value of the phase error signal (FIG. 20C) generated at this point clearly has a negative value even though the phase position of the actual track wobble signal would be correct without the LPP.

Using a method according to the invention, which shall be explained by way of two embodiments, the generation of a faulty phase error signal is avoided.

Figure 21:
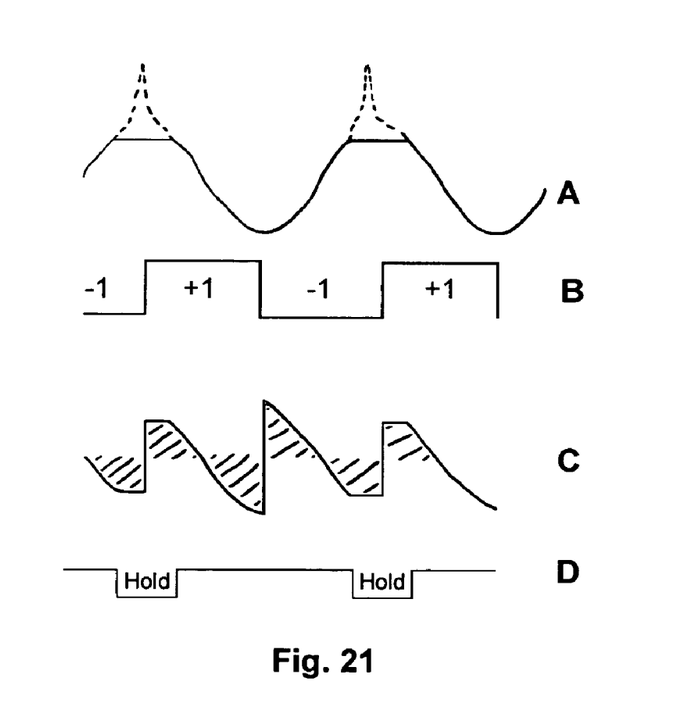
FIG. 21 a signal diagram when using a PLL according to a first version of a first embodiment.

A first embodiment is illustrated in FIG. 21. Since the LPP signal occurs at particular positions of the track wobble signal (FIG. 21A) and has a particular tolerance with respect to this theoretical position, it is possible to control a sample/hold block by a window signal (S/H gate, FIG. 21D) so that a phase error signal distortion received by the signal of FIG. 21B is muted. For this purpose, the sample/hold block is controlled so as to maintain the voltage value of the TW signal during the expected occurrence of the LPP signal. Right after the expected end of the LPP the sample/hold block is deactivated again.

Figure 24:
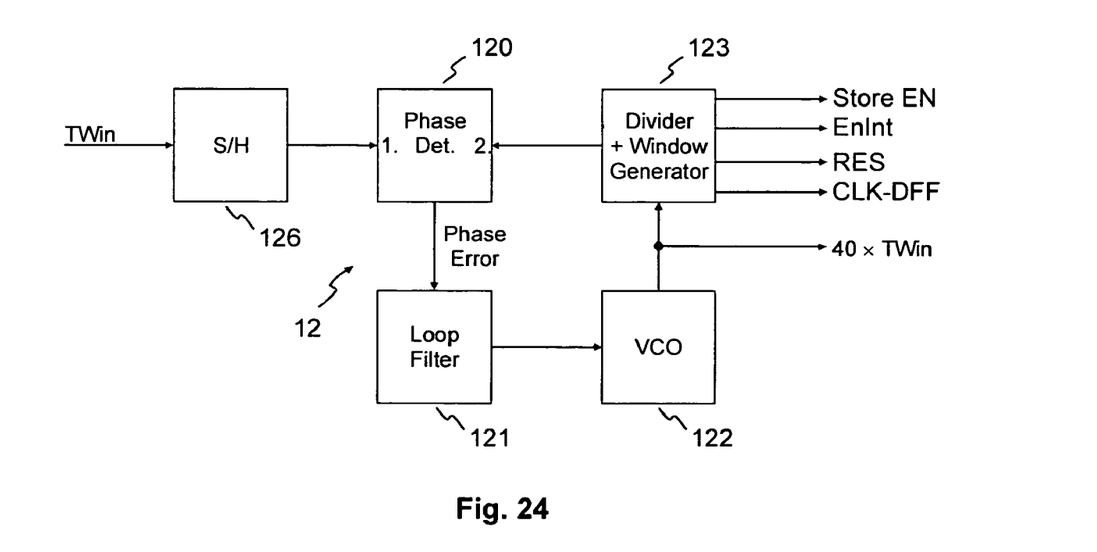
FIG. 24 a PLL according to a first version of a first embodiment, which forms the signals according to FIG. 21(A)

A first embodiment of a PLL 12 according to the invention is illustrated in FIG. 24. A sample/hold block 126 is connected in front of the phase detector 120. The sample/hold block can save the value of an input signal at the beginning of a time interval determined by a control signal (S/H gate, not shown) and can freeze this value until the end of the time interval. For this purpose the divider 123 is further designed as a window generator, which transmits a corresponding control signal (S/H gate) to the sample/hold block 126. Furthermore, the divider generates the signals Store Enable (Store EN), Enable Integration (EnInt), Reset (RES) and Clock D-Flip Flop (CLK-DFF) to be used in the LPP detection (see also FIGS. 7 and 9).

Figure 25:
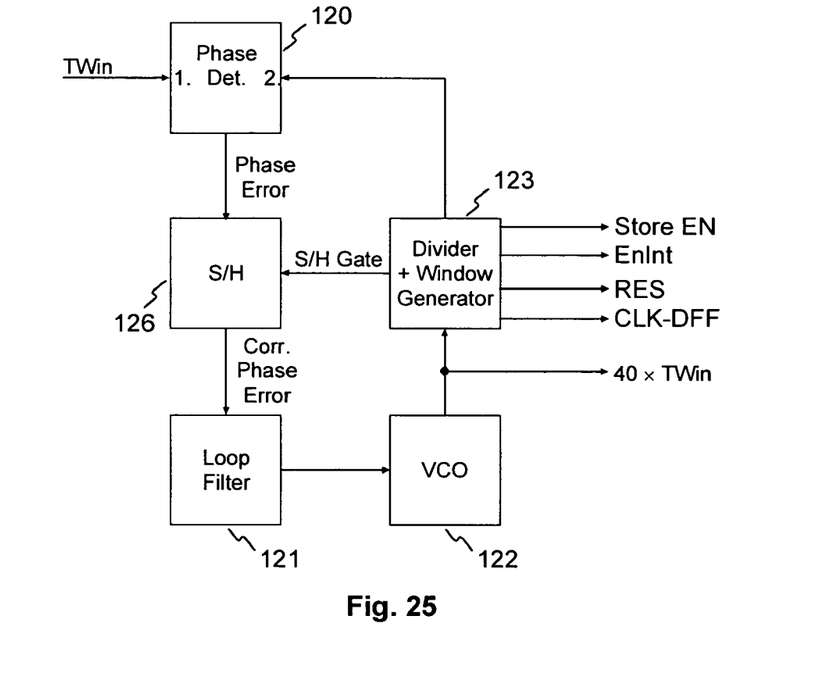
FIG. 25 a PLL according to a second version of a first embodiment, which forms the signals according to FIG. 21(C)

If the input signal is held by the window signal, as shown in FIG. 21D, a phase error signal (FIG. 21C) is generated having an average value of zero despite the occurrence of a LPP. In an alternative version the sample/hold block 126 is inserted between phase detector output and loop filter (FIG. 25). In this case also a corrected phase error signal is generated, the signal shape of which corresponds to the one in FIG. 21C if the window signal (FIG. 21D) is used. The window signal for controlling the Sample sample/hold block 126 is generated by a window generator 123, as shown in FIG. 25. This window generator 123 consists of a counter and a digital comparator setting a window signal to "L" if the counter reading is between two predetermined values. Furthermore, it is possible by means of further digital comparators to generate additional signals which are dependent on the counter reading (see FIG. 27) in order to allow control of the LPP detection in accordance to FIGS. 4 to 14.

For example, if a counter with forty steps is provided, then one step corresponds to a phase angle of 360°/40=9°. If, for example, an LPP is expected at 90°±10°, the S/H gate 126 may for example be started at 7×9°=63° and terminated at 13×9°=117°. An LPP within a width of ±27° around the nominal position will not contribute to the phase detector signal in case of a window signal being generated in this way. Moreover, an integrator control signal (EnInt) as well as a D-FF control signal (Clk-DFF) is favourably used at positions defined by the counter reading for LPP detection (FIGS. 4 to 14). Advantageously, these control signals are derived from the same counter as the window signal (S/H GATE), also shown in FIG. 27.

Figure 22:
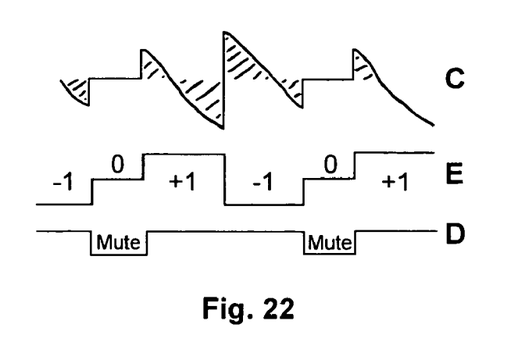
FIG. 22 a signal diagram when using a PLL according to a first version of a second embodiment.
Figure 23:
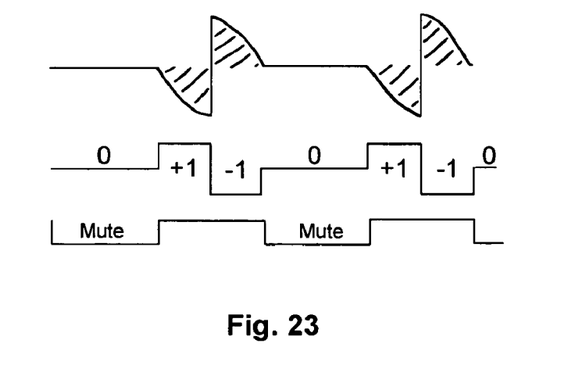
FIG. 23 a signal diagram when using a PLL according to a second version of a second embodiment.
Figure 26:
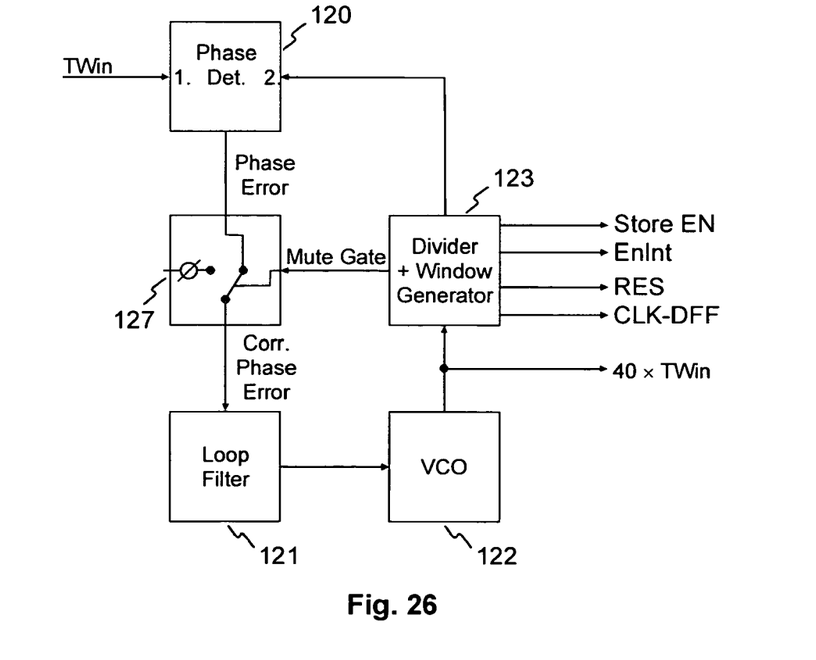
FIG. 26 a PLL according to both versions of a second embodiment, which forms the signals according to FIGS. 22 or 23.

A second embodiment for generating a phase error signal not being affected by LPP is shown in FIG. 26. Within the time interval in which the LPP occurs, the phase error signal is switched to zero. For this purpose, a switch 127 is inserted between phase detector output and loop filter 121. The resulting phase error signal is shown in FIG. 22E (analogous in FIG. 22C). Due to the muting, see FIG. 22D, of the faulty phase error signal during occurrence of the LPP the average value of the corrected phase error signal (FIG. 22E) remains zero. If necessary, the time interval in which the generation of the phase error signal is muted may be extended to the entire half wave of the track wobble Signal in which a LPP is situated (FIG. 23).

Figure 27:
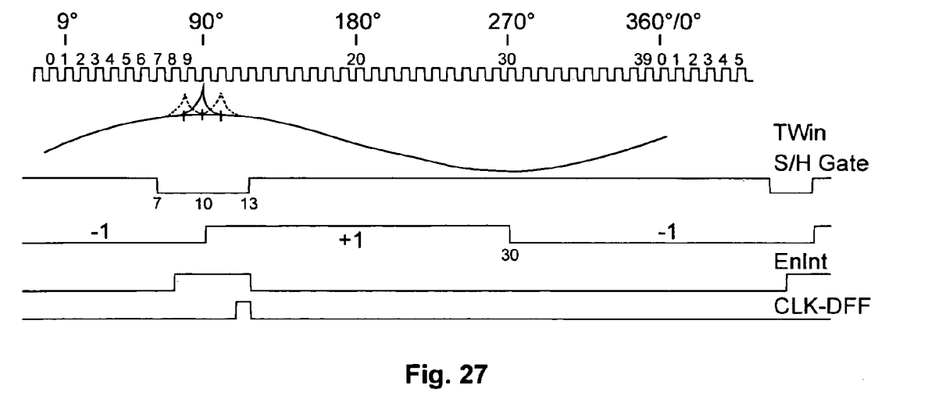
FIG. 27 a signal diagram representing the generation of the control signals for LPP detection as well as the necessary signals for correction of the phase error signal.
Figure 28:
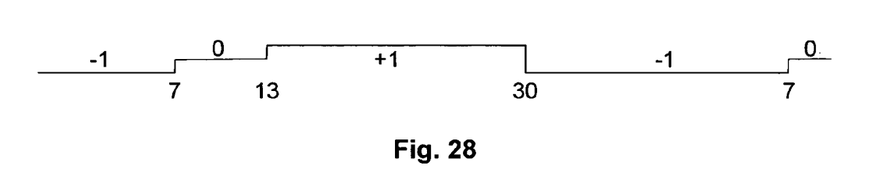
FIG. 28 a signal diagram with respect to an alternative correction of the phase error.

An alternative to the embodiment shown in FIG. 26 is, instead of the square-wave signal controlling the multiplication (+1; −1), to generate a signal which defines three factors (+1; 0; −1) for multiplication. The positions at which one of the factors is valid can also be derived from the counter position. FIG. 28 illustrates that in the area in which a LPP occurs the factor is zero. In this way the product of the phase comparator is retained at zero during the time interval in which a LPP occurs and a faulty generation of the phase error signal is avoided. As already mentioned above it is possible to analyse the counter reading in order to generate additional signals for LPP detection, as illustrated in FIG. 27.

Figure 29:
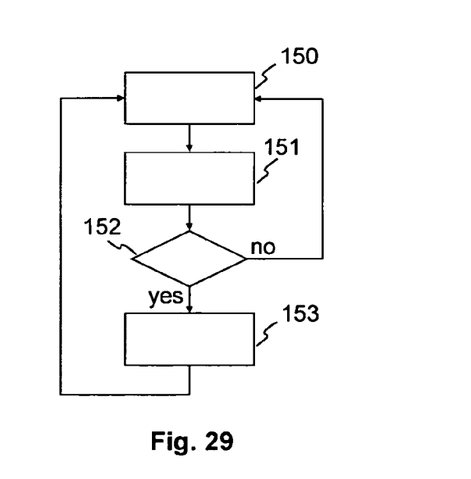
FIG. 29 a flow chart of a method according to the invention.

In FIG. 29 a flow chart of a method according to the invention is shown. In a step 150 a track on the optical recording medium is scanned by obtaining a scanning signal including information about the marks to be detected. This scanning signal is stored in a step 151 at a predetermined sampling time as a reference signal. In a further step 152 the scanning signal is compared with the reference signal. In case the scanning signal deviates from the reference signal in a predetermined way, in a step 153 a mark is determined and the method returns to the scanning step 150. In case the scanning signal does not deviate from the reference signal in a predetermined way, the method returns to the scanning step 150 without determining a mark.

What is claimed, is:

1. Method for detecting land pre-pits on an optical recording medium including the steps of;

scanning a track on said optical recording medium by obtaining a scanning signal including information about said land pre-pits to be detected, storing said scanning signal at a predetermined sampling time as reference signal, and determining a land pre-pit, if said scanning signal deviates from said reference signal in a predetermined way, wherein said determining of a land pre-pit is performed by subtracting said reference signal from said scanning signal, integrating the subtracting signal and comparing the integrated signal with a threshold.

2. Method according to claim 1, wherein said subtracting signal is normalized before it is integrated.

3. Method according to claim 1, wherein said threshold is scaled using a signal representing the amount of light reflected from the optical recording medium or the laser power.

4. Method according to claim 1, wherein timing signals are generated for said sampling, storing and/or determining on the basis of said scanning signal.

5. Method according to claim 4, wherein said timing signals are generated by muting sections of said scanning signal in order to generate said timing signals independent from detected land pre-pits.

6. Method according to claim 1, wherein said predetermined sampling time is determined in dependence of the phase of said scanning signal.

7. Device for detecting land pre-pits on an optical recording medium, wherein it is adapted to perform a method according to claim 1.

8. Device for detecting land pre-pits on an optical storage medium including scanning means for scanning a track on said optical storage medium by obtaining a scanning signal including information about said land pre-pits to be detected, storing means for storing said scanning signal at a predetermined sampling time as reference signal, and determining means for determining a land pre-pit, if said scanning signal deviates from said reference signal in a predetermined way, wherein said determining means include a subtractor for subtracting said reference signal from said scanning signal, and a comparator for comparing the integrated signal with a threshold.

9. Apparatus for reading from and/or writing to optical recording media, wherein it is adapted to perform a method according to claim 1.

10. Method for detecting land pre-pits on an optical recording medium including the steps of:

scanning a track on said optical recording medium by obtaining a scanning signal including information about said land pre-pits to be detected, storing said scanning signal at a predetermined sampling time as reference signal, and determining a land pre-pit, if said scanning signal deviates from said reference signal in a predetermined way, wherein said determining of a land pre-pit is performed by comparing said reference signal with said scanning signal, integrating the compared signal and comparing the integrated signal with a threshold.

* * * * *